(12) United States Patent
Van De Water

(10) Patent No.: US 11,498,448 B2
(45) Date of Patent: Nov. 15, 2022

(54) HIGH POWER BIDIRECTIONAL GRID CONNECTED CHARGER WITH SPLIT BATTERY ARCHITECTURE

(71) Applicant: Enel X North America, Inc., Boston, MA (US)

(72) Inventor: Cornelis Van De Water, Sunnyvale, CA (US)

(73) Assignee: Enel X Way USA, LLC, San Carlos, CA (US)

( * ) Notice: Subject to any disclaimer, the term of this patent is extended or adjusted under 35 U.S.C. 154(b) by 128 days.

(21) Appl. No.: 17/020,480

(22) Filed: Sep. 14, 2020

(65) Prior Publication Data

US 2021/0078435 A1 Mar. 18, 2021

Related U.S. Application Data

(60) Provisional application No. 62/900,140, filed on Sep. 13, 2019.

(51) Int. Cl.
*B60L 55/00* (2019.01)
*B60L 53/14* (2019.01)
*B60L 53/62* (2019.01)
*H02J 3/32* (2006.01)
*B60L 53/63* (2019.01)

(52) U.S. Cl.
CPC ............. *B60L 55/00* (2019.02); *B60L 53/14* (2019.02); *B60L 53/62* (2019.02); *B60L 53/63* (2019.02); *H02J 3/322* (2020.01); *B60L 2210/12* (2013.01); *B60L 2210/30* (2013.01)

(58) Field of Classification Search
CPC .......... B60L 55/00; B60L 53/14; B60L 53/62; B60L 53/63; B60L 2210/12; B60L 2210/30; H02J 3/322; H02J 1/082; H02J 7/02; H02J 7/342; H02J 2207/20; Y02E 60/00; Y02T 10/70; Y02T 10/7072; Y02T 10/72; Y02T 90/12; Y02T 90/14; Y02T 90/167; Y04S 10/126; Y04S 30/12
USPC ............................................................ 320/109
See application file for complete search history.

(56) References Cited

U.S. PATENT DOCUMENTS

2018/0222333 A1* 8/2018 Khaligh ............ H02M 3/33584

\* cited by examiner

*Primary Examiner* — Paul Dinh
(74) *Attorney, Agent, or Firm* — Foley & Lardner LLP

(57) ABSTRACT

High power bidirectional charging systems with a split battery architecture are disclosed. The bidirectional charging systems can include a bidirectional charger and an integrated battery. The bidirectional charger is bidirectional, providing vehicle-to-grid (V2G) energy transfer capability from an electrical grid to an electric vehicle (EV), as well as electrical energy transfer capability from the integrated battery to the power grid and from EV battery to the electrical grid. The integrated battery is split into two sections. A first battery section is a lower voltage battery, which can feed the output direct current (DC) directly without a converter. A second battery section is a higher voltage battery. The output power provided by the charger can exceed voltage limits of the individual electronic components by adding the output of the first integrated battery section with an output of the second integrated battery section.

20 Claims, 3 Drawing Sheets

HIGH POWER BIDIRECTIONAL GRID CONNECTED CHARGER WITH SPLIT BATTERY ARCHITECTURE

RELATED APPLICATIONS

This application claims the benefit of priority under 35 U.S.C. § 119(e) of U.S. Provisional Application No. 62/900,140 filed on Sep. 13, 2019, which is hereby incorporated herein by reference in its entirety.

TECHNICAL FIELD

The disclosed embodiments relate in general to the field of electrical vehicle charging technology and power grid management, and more specifically to a high power bidirectional grid-connected charger with a split battery architecture.

BACKGROUND

Most electric vehicles are charged from an electrical grid (e.g., a public utility electrical grid). As it is also well known in the art, electric vehicle supply equipment may be used to assist in balancing of the aforesaid electrical grid by providing electrical power from the vehicle battery or a backup battery during times of high demand. This is achieved by employing a bidirectional grid-connected battery charger, which can charge a battery from the electrical grid and provide electrical power from the battery back to the grid at times of high demand. Unfortunately, existing bidirectional chargers lack necessary power to provide meaningful grid balancing.

SUMMARY

Improved systems and methods for providing high power bidirectional charging with an electric grid interface are disclosed.

Additional aspects and advantages will be apparent from the following detailed description of preferred embodiments, which proceeds with reference to the accompanying drawings.

BRIEF DESCRIPTION OF THE DRAWINGS

The accompanying drawings, which are incorporated in and constitute a part of this specification illustrate embodiments of the present invention and, together with the description, serve to explain and illustrate principles of the inventive technique. Specifically.

DETAILED DESCRIPTION OF PREFERRED EMBODIMENTS

Figure 1:
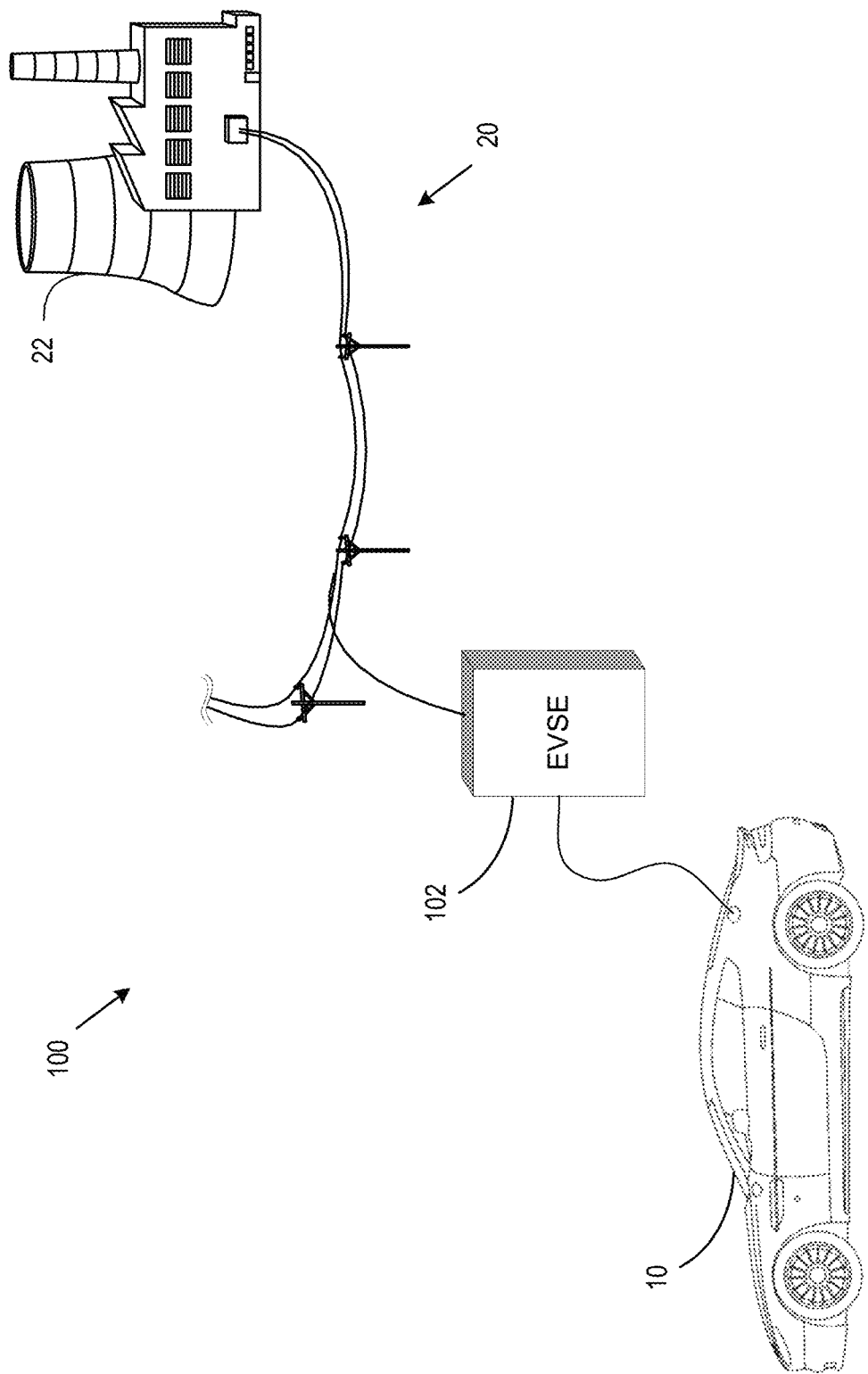
FIG. 1 is a bidirectional grid-connected electric vehicle battery charging system 100, according to one embodiment of the present disclosure.

Most electric vehicles are charged from an electrical grid, such as a public utility electrical grid. Electric vehicles supply equipment may be used to assist in balancing that electrical grid by providing electrical power from the vehicle battery or a backup battery during times of high demand. This is achieved by employing a bidirectional grid-connected battery charger, which has the ability to charge a battery from the electrical grid and provide electrical power from the battery back to the grid at times of high demand. Unfortunately, the existing bidirectional chargers lack necessary power to provide meaningful grid balancing. Therefore, new and improved systems and methods for providing a high power bidirectional charger with an electric grid interface may be desirable.

The present disclosure is directed to systems and methods that attempt to address one or more of the above and other shortcomings, problems, and issues associated with conventional systems and methods for electrical vehicle charging and power grid management. One or more embodiments described herein are directed to overcoming several limitations of existing technology, in terms of output voltage, by splitting an integrated battery in two sections and in using the converters for charging and also to balance between the two batteries.

In one or more embodiments, an architecture provides for a 350 kW (400 kW peak) Combined Charging System (CCS) charger with a battery backup. In one or more embodiments, the charger incorporates an integrated battery.

In one or more embodiments, the described charger is entirely bi-directional, providing electrical energy transfer capability from the grid to an electric vehicle (EV) battery, as well as electrical energy transfer capability from the integrated battery to the power grid and from the EV battery to the power grid (e.g., vehicle-to-grid (V2G) energy transfer capability) or to the integrated battery.

In one or more embodiments, the integrated battery is split into two sections. A first battery section is a low voltage battery of 170V to a maximum of 200V, which feeds the output directly without converter. A second battery section delivers 770V-920V. As would be appreciated by persons of ordinary skill in the art, the aforesaid voltage is within voltage limits of Silicon Carbide (SiC) MOSFET transistors (1200V) and can guarantee delivery of up to 750 v with the use of a stack of buck DC-DC configured Active Front End (AFE) electronics.

The aforesaid electrical output of up to 750V can be added to the 170V-max 200V output of the low voltage battery section to create 200-920V output as required by the Combined Charging System (CCS) High Power Charging (HPC) standard. The manner of adding the output of the two batteries can be according to techniques and methods known in the art.

In accordance with one aspect of the present disclosure, an embodiment of a bidirectional grid-connected electric vehicle battery charging system can include: a bidirectional charger; a first integrated battery electrically coupled to the bidirectional charger; and a second integrated battery with a working voltage substantially higher than a working voltage of the first battery, the second battery electrically coupled to the bidirectional charger, wherein the bidirectional charger is configured to provide the vehicle-to-grid (V2G) energy transfer capability, as well as electrical energy transfer capability from the integrated battery to the power grid and from electric vehicle (EV) battery to the integrated battery or the power grid.

In one or more embodiments, the working voltage of the first battery is between 170 and 200 volts. In one or more embodiments, the working voltage of the second battery is between 770 and 920 volts.

In one or more embodiments, the bidirectional charger comprises a grid interactive AC-DC converter. In one or more embodiments, the bidirectional charger comprises a bidirectional isolated DC-DC converter that converts DC power from the side that is higher in voltage to the side that is lower in voltage, wherein the conversion ratio is 1:1.

In one or more embodiments, the bidirectional charger comprises an Active Front End (AFE) boost converter connected backwards to step voltage down (buck) in the forward direction for connecting to the second battery. In one or more embodiments, the bidirectional charger comprises an AFE boost converter connected backwards to generate an output voltage varying from 0 up to the input voltage.

FIG. 1 is a bidirectional grid-connected electric vehicle battery charging system 100, according to one embodiment of the present disclosure. A high power bidirectional charger 102 with a split battery architecture is configured to be positioned between an electric vehicle (EV) 10 and a electrical grid 20 of a public utility 22 to facilitate both charging a battery of the EV 10 from the electrical grid 20 and providing electrical power from the battery of the EV 10 back to the electrical grid 20 at times of high demand. In other words, the bidirectional capability of the charger 102 enables transfer of electrical energy from the grid 20 to the EV 10 to charge a battery of the EV 10 and transfer of electrical energy from the battery of the EV 10 to the electrical grid 20 as a demand response during period of high demand to aid in maintain balance of the electrical grid 20.

The high power bidirectional charger 102 may be (or embody), may be included in, or may otherwise be integrated with equipment commonly understood as an electric vehicle supply equipment (EVSE). As is well known, an EVSE may be used to assist in balancing of the electrical grid 20 by providing electrical power from the battery of the EV 20 (or from a backup battery) during times of high demand. However, presently available bidirectional chargers (e.g., bidirectional EVSE) lack sufficient power to provide meaningful grid balancing. The high power bidirectional charger 102 can include or otherwise electrically couple to a first integrated battery and a second integrated battery to enhance vehicle-to-grid (V2G) energy transfer capability, as will be explained, while also providing the core capability of grid-to-vehicle (G2V) energy transfer.

Figure 2:
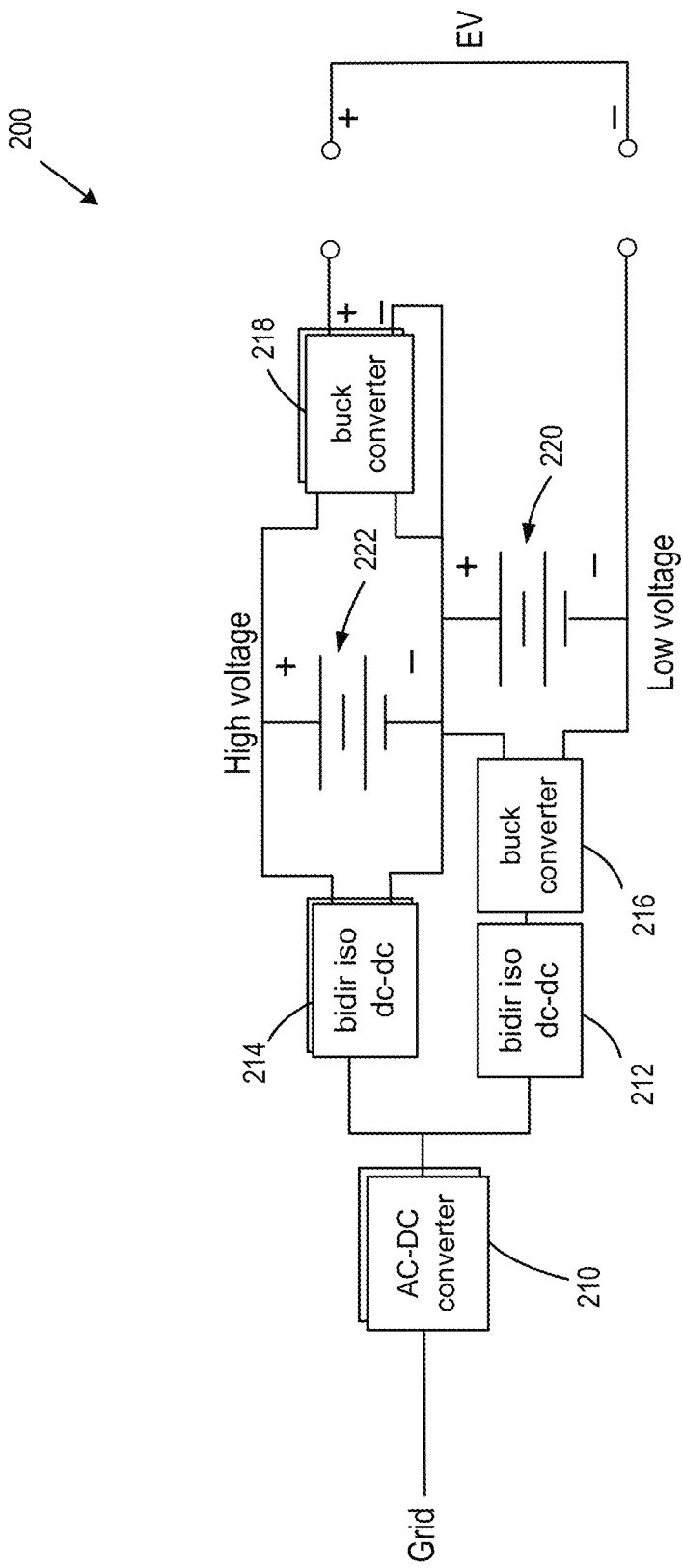
FIG. 2 is a block diagram of an embodiment of a high power bidirectional charger with split battery architecture, according to one embodiment of the present disclosure.

FIG. 2 is a block diagram of a high power bidirectional charger 200 with a split battery architecture, according to one embodiment of the present disclosure. The high power bidirectional charger 200 may be the same, similar to, or analogous to the high power bidirectional charger 102 of FIG. 1 and these may include similar features and elements. The bidirectional charger 200 can provide vehicle-to-grid technology that enables energy to be pushed back to the power grid from the battery of an EV. Further, the bidirectional charger 200 includes integrated batteries as an available power source too push energy back to the grid, regardless of whether an EV is connected to the charger 200. The bidirectional charger 200 includes one or more bidirectional AC-DC converters 210, a first bidirectional isolated DC-DC converter 212, one or more second bidirectional isolated DC-DC converters 214, a first buck converter 216, one or more second buck converters 218, a first integrated battery 220, and a second integrated battery 222.

The one or more AC-DC converters 210 each are a grid interactive AC-DC converter that may or may not be bidirectional. The AC-DC converters 210, according to some embodiments, may each be an Active Front End (AFE) converter. An AC-DC converter 210 interfaces with and receives AC electricity from an electric grid and converts the received AC electricity to DC electricity and steps up the voltage. Though a single input is shown in FIG. 2, one of ordinary skill readily recognizes that the input may be a three-phase input. The AC-DC converter 210 in turn provides the DC electricity to the first bidirectional isolated DC-DC converter 212 and the one or more second bidirectional isolated DC-DC converters 214.

The first bidirectional isolated DC-DC converter 212 converts DC power from a grid side (in this case the side connected from the one or more AFE converters 210) to a battery side (in this case the side connected to the buck converter 216). A single first bidirectional isolated DC-DC converter 212 may supply electricity to the relatively lower voltage first integrated battery 220 (lower voltage relative to the second integrated battery 222) with ample current and/or power. In other words, multiple bidirectional isolated DC-DC converters are not needed to supply DC electricity to the lower voltage first integrated battery 220. The first bidirectional isolated DC-DC converter 212 provides isolation from the grid. There may be little or no change in current and/or voltage from the grid side to the battery side. Stated otherwise, a conversion ratio of the first bidirectional isolated DC-DC converter 212 may be 1:1 or approximately 1:1. The first bidirectional isolated DC-DC converter 212 may also have another appropriate conversion ratio.

The one or more second bidirectional isolated DC-DC converters 214 also convert DC power from a grid side (in this case the side connected from the one or more AFE converters 210) to a battery side (in this case the side connected to the second integrated battery 222). Each of the one or more second bidirectional isolated DC-DC converters 214 may be identical or substantially similar to the first bidirectional isolated DC-DC converter 212. Multiple of the second bidirectional isolated DC-DC converters 214 may supply electricity to the relatively higher voltage second integrated battery 222 (higher voltage relative to the first integrated battery 220) to provide ample current and/or power. The one or more second bidirectional isolated DC-DC converter 214 provides isolation from the grid. There may be little or no change in current and/or voltage from the grid side to the battery side. Stated otherwise, a conversion ratio of the one or more second bidirectional isolated DC-DC converters 214 may be 1:1 or approximately 1:1. The one or more second bidirectional isolated DC-DC converters 214 may also have another appropriate conversion ratio.

The first buck converter 216 receives DC electricity from the first bidirectional isolated DC-DC converter 212 and steps down the voltage of the DC electricity to an appropriate level to supply to the first integrated battery 220. The first buck converter 216 may be an AFE buck converter. The buck converter 216 may be an identical or substantially similar electronic component as the one or more AC-DC converters 210 but connected backwards to step voltage down for the relatively lower voltage first integrated battery 220.

The one or more second buck converters 218 each receives DC electricity from the higher voltage second integrated battery 222 and can step down the voltage of the DC electricity to an appropriate level to supply for DC fast charging of an EV. The one or more second buck converters 218 may each be an AFE buck converter. The buck converter 218 may be an identical or substantially similar electronic component as the one or more AC-DC converters 210 but connected backwards to step voltage down as needed to provide DC fast charging of an EV. The AFE buck converter 218 may generate an output voltage varying from 0 V up to the input voltage (from the second integrated battery 222).

The first integrated battery 220 may be a relatively lower voltage battery, as compared to the second integrated battery 222. In other words, the second integrated battery 222 may have a working voltage substantially or at least notably higher than a working voltage of the first integrated battery 220. As can be appreciated, a majority of the power though the bidirectional charger 200 is passed through the higher voltage second integrated battery 222.

The first integrated battery 220 and the second integrated battery 222 create the split battery architecture of the bidirectional charger 200 that avails several advantages. The integrated batteries 220, 222 provide a battery-backed bidirectional charger 200 architecture that can aid in balancing the grid even though an EV may not be attached to the bidirectional charger 200. The integrated batteries 220, 222 provide an available power source, regardless of whether an EV is connected to the charger 200. The bidirectional charger 200 can provide vehicle-to-grid technology that enables energy to be pushed back to the power grid from the battery of an EV, and also to provide a similar demand response by pushing energy back to the power grid from the integrated batteries 220, 222 whether or not an EV is connected to the bidirectional charger 200.

The higher voltage and lower voltage combination of integrated batteries 220, 222 also achieves efficiencies in hardware and operation. Presently available electronics may have a limit (e.g., a drop-off point) in performance of the silicon at about 900 V. The so-called silicon unipolar device limit is in the voltage range from 200 V to 900 V. Exceeding that 900 V threshold requires super junction MOSFETs and/or other more complex circuitry that is costly and bulky. With a split battery architecture, the high power bidirectional charger 200 can combine outputs from both the lower voltage first integrated battery 220 and the higher voltage second integrated battery 222 to be able to always guarantee a combined output that exceeds 900 V, such as may be required by a DC fast charging standard. For example, the Combined Charging System (CCS) is a standard for DC fast charging an EV and that requires ability to supply up to 920 V. The combined output of the lower voltage integrated battery 220 and the output of the higher voltage integrated battery 222 can guarantee always being able to provide up to the required 920 V of the CCS standard.

Stated otherwise, the architecture with two different internal batteries 220, 222 can permit an output voltage higher than the individual electronics of the high power bidirectional charger 200 can handle. By adding the output voltage of the first integrated battery 220 under the output voltage of the second integrated battery 222, an output voltage is possible in a range that exceeds a threshold of what the electronics of the high power bidirectional charger can handle.

The split high-low battery architecture of the bidirectional charger 200 of FIG. 2 also can minimize an amount of conversion to achieve a desired output. The converters 210, 216, 218 can be single-stage converters. Two-stage converters are more complicated than single-stage converters, which can create a larger overall bidirectional converter (e.g., a bulkier product). Two-stage converters also tend to generate greater heat than single-stage converters, requiring additional cooling hardware or equipment for operation. The split high-low battery architecture of the bidirectional charger 200 minimizes conversion, thereby minimizing complication and heat generation, which thereby can minimize associated size of the overall charger and costs for necessary cooling.

For varying output voltage, the current drawn from the second integrated battery 222 is different than from the first integrated battery 220. Therefore, a balance between the state of charge of the second integrated battery 222 and the first integrated battery 220 may be shifting when delivering either a relatively higher or lower output voltage.

To counter-act this imbalance, the DC-DC converters 212, 214 on the input can be used to send power from one battery 220, 222 with a higher state of charge (SoC) to the other battery 222, 220 with a lower SoC. This sending of power from one battery 220, 222 to the other can occur in addition to any charging or discharging occurring from/to the grid.

Figure 3:
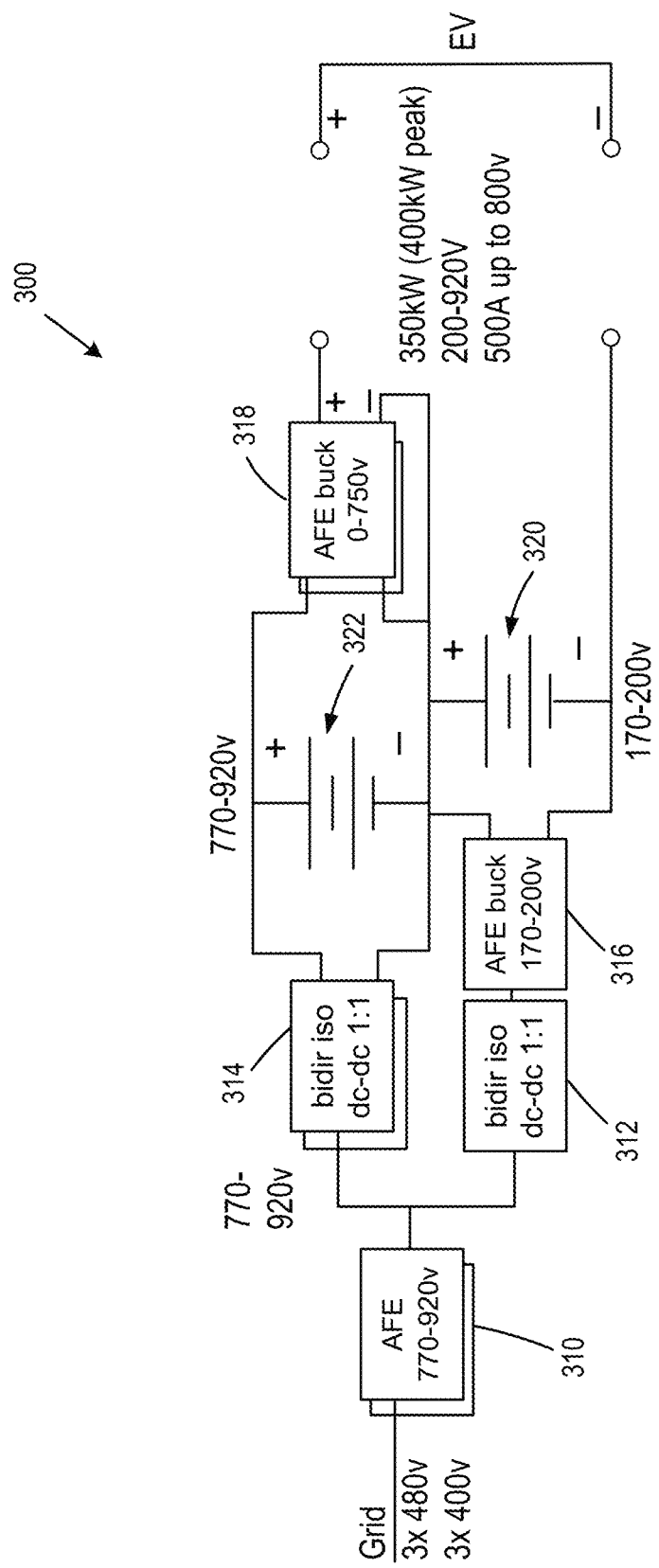
FIG. 3 is a block diagram of another embodiment of a high power bidirectional charger with split battery architecture, according to one embodiment of the present disclosure.

FIG. 3 is a block diagram of another embodiment of a high power bidirectional charger 300 with split battery architecture, according to one embodiment of the present disclosure. The high power bidirectional charger 300 may be similar to the high power bidirectional charger 200 of FIG. 2 in some or many respect. Moreover, the bidirectional charger 300 may be one design and/or implementation of the bidirectional charger 200 of FIG. 2.

The bidirectional charger 300 includes one or more AC-DC converters 310, a first bidirectional isolated DC-DC converter 312, one or more second bidirectional isolated DC-DC converters 314, a first AFE buck converter 316, a second AFE buck converter 318, a first integrated battery 320, and a second integrated battery 322.

The electric grid of FIG. 3 may supply three-phase AC at either 480 V or 400 V. The electric grid of FIG. 3 may supply AC at up to 145 A for a 100 kVA interface embodiment.

The one or more AC-DC converters 310 that may or may not be bidirectional and grid interactive. In FIG. 3, the AC-DC converters 310 are each an AFE converter 310. The one or more AFE converters 310 each interfaces with and receives the three-phase AC electricity from the electric grid and converts the received AC electricity to DC electricity and steps up the voltage to be within the range 770 V-920 V. The AFE converter 310 in turn provides the DC electricity to the first bidirectional isolated DC-DC converter 312 and the one or more second bidirectional isolated DC-DC converters 314.

The first bidirectional isolated DC-DC converter 312 converts DC power from a grid side (in this case the side connected to the one or more AFE converters 310) to a battery side (in this case the side connected from to the AFE buck converter 316). A single first bidirectional isolated DC-DC converter 312 may supply DC electricity in the range of 770 V-920 V to the relatively lower voltage first integrated battery 320 (lower voltage relative to the second integrated battery 322) with ample current and/or power. In other words, multiple bidirectional isolated DC-DC converters are not needed to supply DC electricity to the lower voltage first integrated battery 320. The first bidirectional isolated DC-DC converter 312 provides isolation from the grid. There may be little or no change in current and/or voltage from the grid side to the battery side. Stated otherwise, a conversion ratio of the first bidirectional isolated DC-DC converter 312 may be 1:1 or approximately 1:1, thereby supplying a safe, consistent supply of 770 V-920 V DC electricity according to the DC electricity supplied from the one or more AFE converters 310.

The one or more second bidirectional isolated DC-DC converters 314 also convert DC power from a grid side (in this case the side connected from the one or more AFE converters 310) to a battery side (in this case the side connected to the second integrated battery 322). Each of the one or more second bidirectional isolated DC-DC converters 314 may be identical or substantially similar to the first bidirectional isolated DC-DC converter 312. Multiple of the second bidirectional isolated DC-DC converters 314 may supply electricity to the relatively higher voltage second integrated battery 322 (higher voltage relative to the first integrated battery 320) to provide ample current and/or power. The one or more second bidirectional isolated DC-DC converters 314 provides isolation from the grid. There may be little or no change in current and/or voltage from the grid side to the battery side. Stated otherwise, a conversion ratio of the one or more second bidirectional isolated DC-DC converters 314 may be 1:1 or approximately 1:1, thereby supplying a safe, consistent supply of 770 V-920 V DC electricity according to the DC electricity supplied from the one or more AFE converters 310.

The first AFE buck converter 316 receives the 770 V-920 V DC electricity from the first bidirectional isolated DC-DC converter 312 and steps down the voltage of the DC electricity to 170 V-200 V to supply to the first integrated battery 320. The AFE buck converter 316 may be an identical or substantially similar electronic component as each of the one or more AFE converters 310 but connected backwards to step voltage down for the relatively lower voltage first integrated battery 320.

The second AFE buck converter 318 receives 770 V-920 V DC electricity from the higher voltage second integrated battery 322 and can step down the voltage of the DC electricity to 0 V-750 V as appropriate to be added to an output of the first integrated battery 320 for DC fast charging of an EV. The AFE buck converter 318 may be an identical or substantially similar electronic component as the one or more AFE converters 310 but connected backwards to step voltage down as needed to provide DC fast charging of an EV. The AFE buck converter 318 may generate an output voltage varying from 0 V up to 750 V, which is added to the output of the first integrated battery 320 to DC fast charge and EV with 200 V-920 V.

The first integrated battery 320 may be a relatively lower voltage battery, as compared to the second integrated battery 322. In other words, the second integrated battery 322 may have a working voltage substantially or at least notably higher than a working voltage of the first integrated battery 320. As can be appreciated, a majority of the power though the bidirectional charger 300 is passed through the higher voltage second integrated battery 322.

The first integrated batter 320 and the second integrated battery 322 create the split battery architecture of the bidirectional charger 300 that avails several advantages. The integrated batteries 320, 322 provide a battery-backed bidirectional charger 300 architecture that can aid in balancing the grid even though an EV may not be coupled to the bidirectional charger 300. The integrated batteries 320, 322 provide an available power source, regardless of whether an EV is connected to the bidirectional charger 300.

The higher voltage and lower voltage combination of integrated batteries 320, 322 also achieves efficiencies in hardware and operation. Presently available electronics may have a limit (e.g., a drop-off point) in performance of the silicon at about 900 V. The so-called silicon unipolar device limit is in the voltage range from 200 V to 900 V. Exceeding that 900 V threshold requires super complex circuitry that is costly and/or bulky. With a split battery architecture, the high power bidirectional charger 300 can combine outputs from both the lower voltage first integrated battery 320 and the higher voltage second integrated battery 322 to be able to always guarantee a combined output that exceeds 900 V, such as may be required by a DC fast charging standard. For example, the Combined Charging System (CCS) is a standard for DC fast charging an EV and requires the ability to supply up to 920 V. The combined output of the lower voltage integrated battery 320 and the output of the higher voltage integrated battery 322 can guarantee always being able to provide up to the required 920 V of the CCS standard.

Stated otherwise, the architecture with two different internal batteries 320, 322 can permit an output voltage higher than the individual electronics of the high power bidirectional charger 300 can handle. By adding the output voltage of the first integrated battery 320 under the output voltage of the second integrated battery 322, an output voltage is possible in a range that exceeds a threshold of what the electronics of the high power bidirectional charger can handle. In this case, the range extends up to 950 V, which exceeds a 900 V capability of the electronics of the converter 300.

In the illustrated embodiment of FIG. 3, and other embodiments, the architecture with two different internal batteries permits an output a voltage higher than the electronics can handle. Specifically, by adding the 170V to 200V output of the first integrated battery 320 under the 0 V to 750 V output of the second integrated battery 322, an output voltage of 200 V to 920 V is created, as required for DC fast charging according to certain standards (e.g., the CCS standard); when we compare the voltage ranges on the batteries we see that at maximum charge level, the total voltage is 200 V added under 920 V for up to 1120V, a voltage that the individual electronics cannot handle. The addition of the 200V battery that is not seen by the electronics (because it feeds the output directly), increases the output voltage higher than otherwise possible, and the output is compliant to standards without requiring higher voltage parts.

The bidirectional charger 300 of FIG. 3 may be capable of delivering DC electricity to charge a battery of an electric vehicle (EV) at approximately 350 kilowatts (kW) (up to 40 kilowatts peak), between 200 volts and 900 volts, and 500 A up to 800 volts.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the embodiments disclosed herein. Various aspects and/or components of the described embodiments may be used singly or in any combination in systems and methods for electric vehicle charging and electric grid balancing.

Stated otherwise, it will be obvious to those having skill in the art that many changes may be made to the details of the above-described embodiments without departing from the underlying principles of the invention. The scope of the present invention should, therefore, be determined only by the following claims.

The invention claimed is:

1. A bidirectional grid-connected electric vehicle battery charging system comprising:
   a bidirectional charger;
   a first integrated battery electrically coupled to the bidirectional charger; and
   a second integrated battery with a working voltage substantially higher than a working voltage of the first integrated battery, the second integrated battery electrically coupled to the bidirectional charger,
   wherein the bidirectional charger is configured to receive alternating current (AC) electricity from an electrical grid and is configured to provide direct current (DC) electricity to charge a battery of an electric vehicle (EV), to provide vehicle-to-grid (V2G) energy transfer capability to transfer electricity from the battery of the EV back to the electrical grid, and to provide energy transfer capability to transfer electricity from one or more of the first and second integrated batteries to the electrical grid.

2. The bidirectional grid-connected electric vehicle battery charging system of claim 1, wherein the bidirectional charger is further configured to provide energy transfer capability to transfer electricity from the battery of the EV to one or more of the first and second integrated batteries.

3. The bidirectional grid-connected electric vehicle battery charging system of claim 1, wherein the bidirectional charger is configured to provide DC electricity through adding an output of the first integrated battery under an output of the second integrated battery.

4. The bidirectional grid-connected electric vehicle battery charging system of claim 1, wherein the bidirectional charger is configured to provide energy transfer capability between the first integrated battery and the second integrated battery to balance a state of charge of the first integrated battery and the second integrated battery.

5. The bidirectional grid-connected electric vehicle battery charging system of claim 1, wherein the working voltage of the first integrated battery is between 170 volts and 200 volts.

6. The bidirectional grid-connected electric vehicle battery charging system of claim 1, wherein the working voltage of the second integrated battery is between 770 volts and 920 volts.

7. The bidirectional grid-connected electric vehicle battery charging system of claim 1, wherein the bidirectional charger comprises a grid interactive AC-DC converter.

8. The bidirectional grid-connected electric vehicle battery charging system of claim 1, wherein the bidirectional charger comprises one or more bidirectional isolated DC-DC converters that provide isolation from the electrical grid.

9. The bidirectional grid-connected electric vehicle battery charging system of claim 1, wherein the bidirectional charger comprises an Active Front End (AFE) buck converter configured to step voltage down for connecting to the first integrated battery.

10. The bidirectional grid-connected electric vehicle battery charging system of claim 1, wherein the bidirectional charger comprises an Active Front End (AFE) buck converter configured to generate an output voltage varying from 0 V up to the voltage of the second integrated battery.

11. A bidirectional charger to charge an electric vehicle, comprising:
    a bi-directional AC-DC converter to receive alternating current (AC) electricity from an electrical grid and convert the AC electricity into direct current (DC) electricity;
    one or more bidirectional isolated DC-DC converters each to provide isolation of the electrical grid by receiving the DC electricity from the AC-DC converter and generating isolated DC electricity;
    an integrated battery that is split into a first integrated battery section and a second integrated battery section, the second integrated battery section having a working voltage substantially higher than a working voltage of the first integrated battery section,
    wherein the bidirectional charger is configured to provide DC electricity to charge a battery of an electric vehicle (EV), and
    wherein the bidirectional charger is configured to provide vehicle-to-grid (V2G) energy transfer capability to transfer electricity from the battery of the EV back to the electrical grid and to provide energy transfer capability to transfer electricity from the integrated battery to the electrical grid.

12. The bidirectional charger of claim 11, wherein the bidirectional charger is further configured to provide bidirectional energy transfer capability to transfer electricity from the battery of the EV to the integrated battery.

13. The bidirectional charger of claim 11, wherein the bidirectional charger is configured to provide DC electricity to charge the EV through by adding an output of the first integrated battery section to an output of the second integrated battery section.

14. The bidirectional charger of claim 11, wherein the bidirectional charger is further configured to provide energy transfer capability between the first integrated battery section and the second integrated battery section to balance a state of charge of the integrated battery.

15. The bidirectional charger of claim 11, wherein the working voltage of the first integrated battery is between 170 volts and 200 volts.

16. The bidirectional charger of claim 11, wherein the working voltage of the second integrated battery is between 770 volts and 920 volts.

17. The bidirectional charger of claim 11, wherein the AC-DC converter is a grid-interactive AC-DC converter.

18. The bidirectional charger of claim 11, further comprising an Active Front End (AFE) buck converter configured to step down the isolated DC electricity for providing it to the first integrated battery section.

19. The bidirectional charger of claim 11, further comprising an Active Front End (AFE) buck converter configured to step down an output voltage of the second integrated battery section to a level in a range between 0 volts up to a voltage of the second integrated battery section.

20. The bidirectional charger of claim 11, wherein the bidirectional charger provides DC electricity to charge a battery of an electric vehicle (EV) at 350 kilowatts (kW) (400 kW peak), between 200 volts and 920 volts, and 500 A up to 800 volts.

* * * * *